Sept. 11, 1934.　　　　G. C. ERB　　　　1,972,878
SEAMING HEAD
Filed July 6, 1931　　　7 Sheets-Sheet 1

Fig. 1

INVENTOR
George Clinton Erb
BY John C. Carpenter
ATTORNEY

Sept. 11, 1934.   G. C. ERB   1,972,878
SEAMING HEAD
Filed July 6, 1931   7 Sheets-Sheet 3

INVENTOR
George Clinton Erb
BY
John C. Carpenter
ATTORNEY

Sept. 11, 1934.  G. C. ERB  1,972,878
SEAMING HEAD
Filed July 6, 1931   7 Sheets-Sheet 4

INVENTOR
George Clinton Erb
BY John C. Carpenter
ATTORNEY

Sept. 11, 1934.   G. C. ERB   1,972,878
SEAMING HEAD
Filed July 6, 1931   7 Sheets-Sheet 5

INVENTOR
George Clinton Erb.
BY John C. Carpenter
ATTORNEY

Sept. 11, 1934.                    G. C. ERB                    1,972,878
                                 SEAMING HEAD
                               Filed July 6, 1931                7 Sheets-Sheet 6

INVENTOR
George Clinton Erb
BY John C. Carpenter
ATTORNEY

Sept. 11, 1934.   G. C. ERB   1,972,878
SEAMING HEAD
Filed July 6, 1931   7 Sheets-Sheet 7

INVENTOR
George Clinton Erb
BY
John C. Carpenter
ATTORNEY

Patented Sept. 11, 1934

1,972,878

UNITED STATES PATENT OFFICE 1,972,878

SEAMING HEAD

George Clinton Erb, Roselle Park, N. J., assignor to American Can Company, New York, N. Y., a corporation of New Jersey Application July 6, 1931, Serial No. 548,960

9 Claims. (Cl. 113—24)

The present invention relates to seaming heads, such as are used in the interfolding of flanges of metallic containers and their covers and has more particular reference to a seaming mechanism adaptable for non-circular, as well as circular containers.

The principal object of the present invention is the provision of seaming head mechanism of compact and simple construction wherein the seaming elements are carried in controlled paths of travel and wherein the operating parts are enclosed within a rotating head, capable of high speed seaming on non-circular, as well as circular containers.

An important object of the invention is the provision of seaming mechanism comprising a plurality of individual seaming units of compact form, each individually and easily assembled in an improved seaming head.

Numerous other objects of the invention will be apparent as it is better understood from the following description, which, taken in connection with the accompanying drawings, discloses a preferred embodiment thereof.

Referring to the drawings:—

The preferred form of apparatus disclosed in the drawings for the purpose of illustrating the present invention comprises a support housing or frame 51 (Figs. 1 and 2) which may be part of the seaming machine of either the single spindle or the multiple spindle type. When a single spindle construction is used, the housing 51 is stationary, when the machine is multiple spindle, this housing may form part of a rotating element.

The housing 51 supports the seaming head proper which is suspended from an extension 52 projecting outwardly from the frame 51. For this purpose a split bearing 53 is formed in the frame part 52 and this cooperates with a bearing cap 54 which is held by bolts 55 (see also Fig. 11), the bearing parts 53, 54 enclosing and supporting a bushing 56 clamped therein. The bushing 56 is shouldered at 57 and this shoulder cooperates with a similar shoulder formed in the bearing parts and which retains the bushing in exact vertical position.

Figure 2:
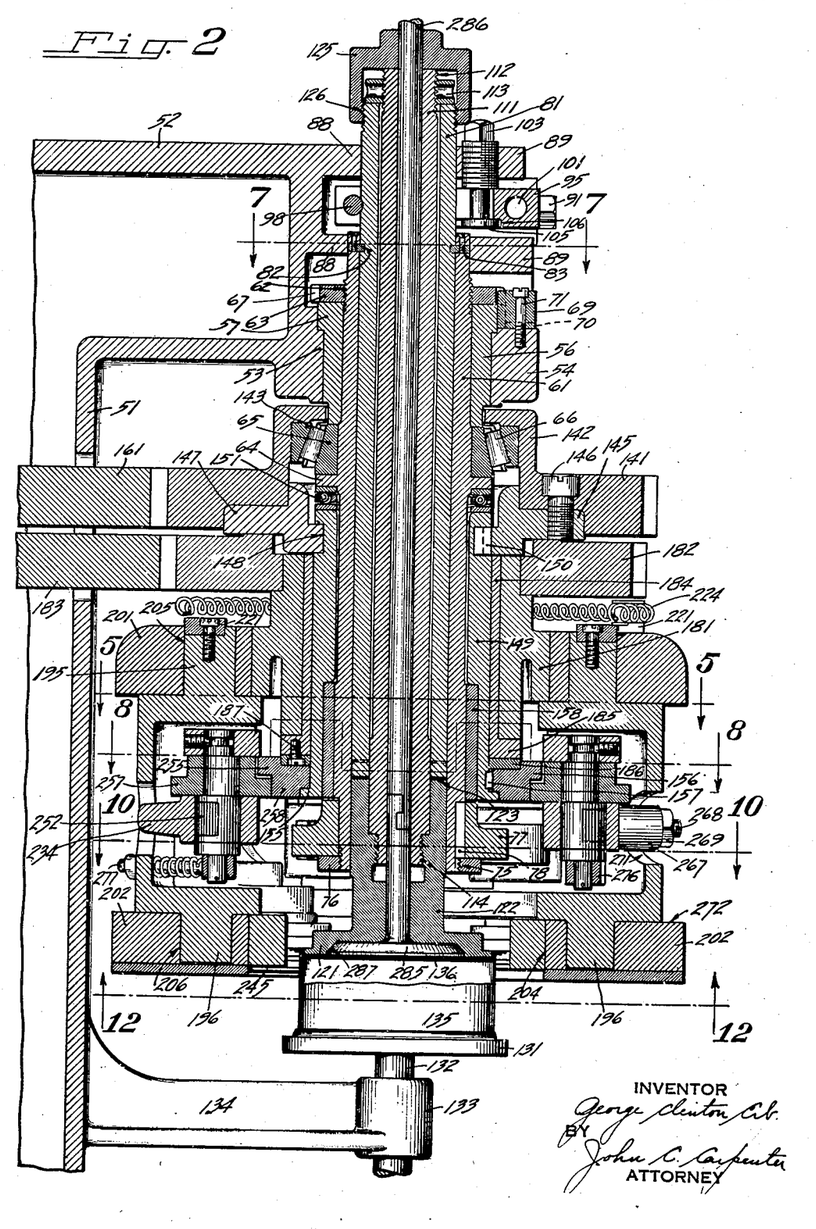
Fig. 2 is a longitudinal sectional view of the head as taken along its longitudinal axis.
Figure 9:
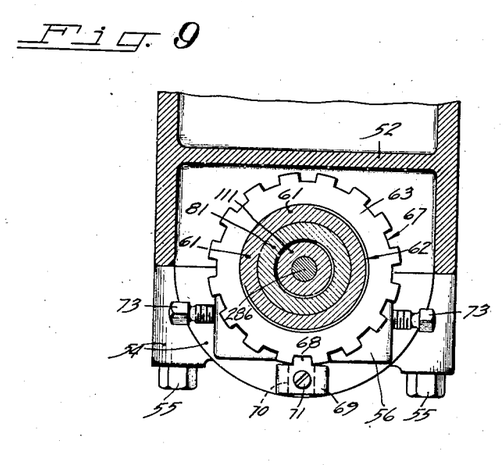
Fig. 9 is a plan sectional detail taken substantially along the line 9—9 in Fig. 1.

A pattern cam sleeve 61 is located within and supported by the bushing 56, the upper part of the sleeve being formed with a thread 62 just beneath its top end. A clamping nut 63 is threadedly engaged with the sleeve thread 62 and rests upon the upper end of the bushing 56. This sleeve 61 is also formed with an annular projecting shoulder 64 located midway of its length and this shoulder supports a ring 65 which is a stationary part of a roller thrust bearing unit 66, the ring being tightly clamped against the bottom end of the bushing 56, as illustrated in Fig. 2. The nut 63 is provided with peripheral notches 67 (see also Fig. 9) one of which is engaged by a locking tongue 68 formed as an integral projection on a block 69 which is held in locking position within a groove 70 formed in the bearing cap 54, a screw 71 being used for this purpose.

Figure 11:
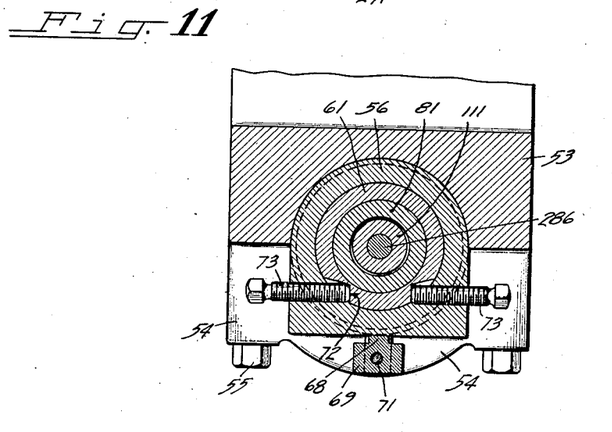
Fig. 11 is a sectional plan detail taken substantially along the line 11—11 in Fig. 1.

The sleeve 61 is slightly rotatable around the inside of the bushing 56 and a fine axial adjustment is provided to insure exact relationship between sleeve and bushing (Fig. 11). For this purpose sleeve 61 is notched toward the front and on opposite sides at 72 and a pair of opposed adjusting screws 73 threadedly mounted toward the front and on opposite sides of the bushing 56, engages the notches 72. Cooperation of these screws shifts and clamps the sleeve in the desired position within the bushing.

The lower end of the cam sleeve 61 is threaded at 75 (Fig. 2) and is threadedly engaged by a clamp nut 76 which holds a pattern cam 77 on the lower end of the sleeve, a key 78 locking the cam 77 against rotative movement relative to the sleeve 61. Adjustment of the cam 77 in reference to its longitudinal axis is thus made at the same time and by means of the axial adjustment of the sleeve 61 within its bushing 56 as just described.

Figure 7:
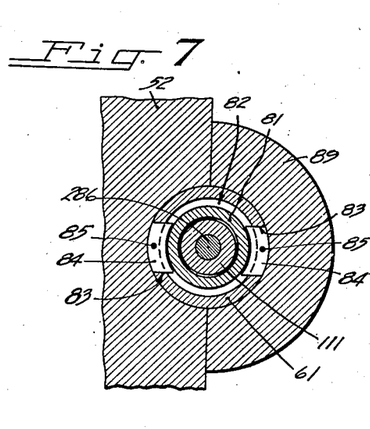
Fig. 7 is a similar detail taken along the line 7—7 in Fig. 2.

A chuck sleeve 81 is longitudinally disposed inside of the cam sleeve 61, and an annular groove 82 is formed in this sleeve adjacent its upper end (Figs. 2 and 7). The upper end of the surrounding cam sleeve 61 is slotted at diametrically opposed positions 83 to accommodate supporting inserts 84 which project inwardly within the annular groove 82 of the chuck sleeve 81. Screws 85 pass through from the top edge of the cam sleeve 61 adjacent the slots 83 and threadedly engage the inserts 84, holding them securely in position. This construction provides a support for the chuck sleeve 81 while permitting relative rotation between it and the sleeve 61.

The top end of the chuck sleeve 81 extends upwardly beyond the cam sleeve 61 and is seated within semi-circular bearing pockets 88 formed in the extension 52 of the frame 51. A bearing cap 89 (see also Figs. 1 and 6) cooperates with these bearing pockets 88 by being clamped with bolts 91 against the extension 52. This bearing cap 89 is also recessed or cut away at 92 to provide a pocket for an axial adjusting device for the chuck sleeve 81 which in turn controls the position of the chuck as hereinafter set forth.

Figure 1:
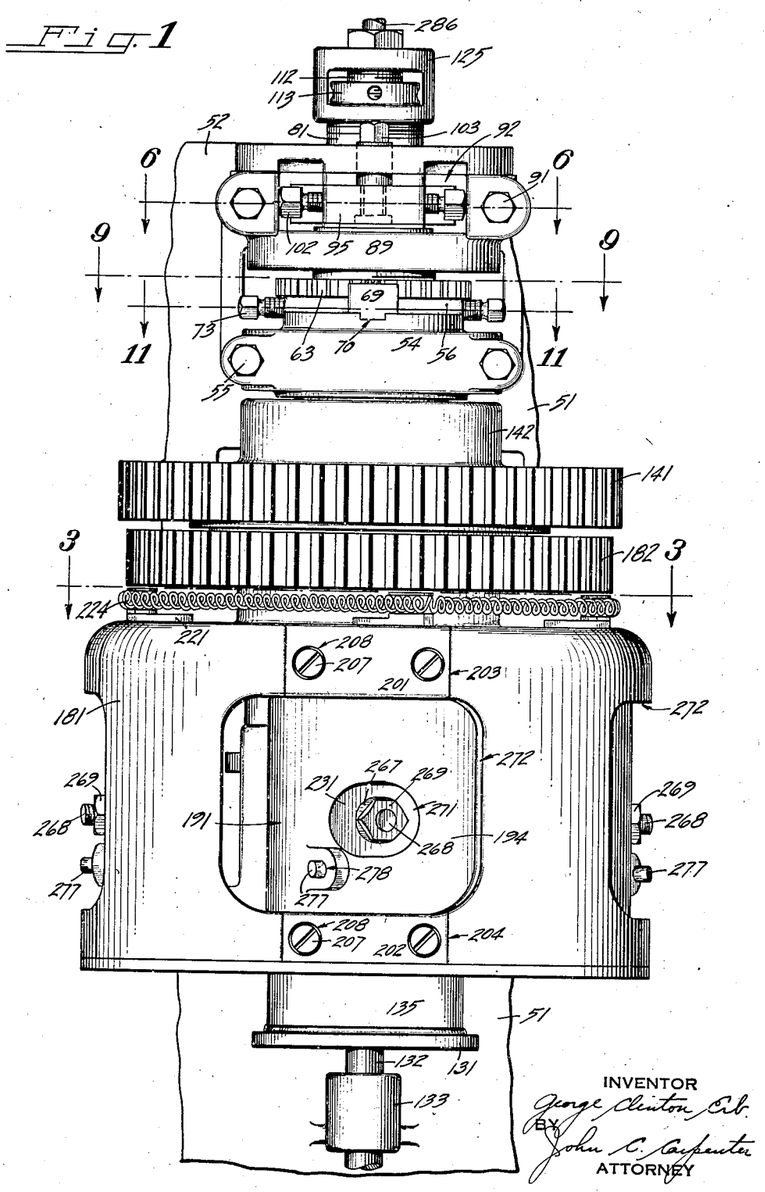
Figure 1 is a front elevation, partially broken away of an improved construction of seaming head embodying the present invention.
Figure 6:
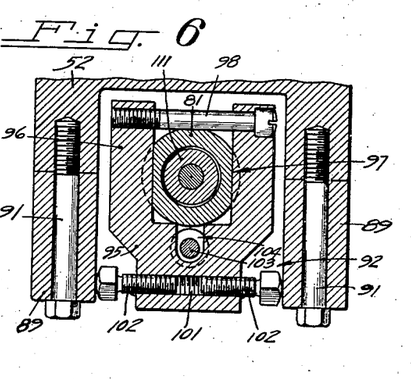
Fig. 6 is a plan sectional detail taken substantially along the line 6—6 in Fig. 1.

This device comprises a yoke 95 which straddles the chuck sleeve 81, its legs 96 resting within grooves 97 formed on opposite sides of the sleeve. The legs 96 of the yoke are joined at the rear of the chuck sleeve by a clamping bolt 98. This yoke 95, along its front side, is provided with a horizontal bore 101 in which two adjusting screws 102 are threadedly mounted, the screws being inserted from opposite sides of the bore. As illustrated in Figs. 1 and 6, the heads of these screws 102 abut against the walls of the bearing cap 89 adjacent the opening 92. By adjusting the screws 102 relative to each other and within their threaded seats the yoke 95 is caused to move around the vertical axis of the chuck sleeve 81 and this correspondingly rotates the sleeve into the desired adjusted position.

A locking bolt 103 (Figs. 2 and 6) threadedly engaging within the bearing cap 89, projects through a slot 104 formed in the yoke 95 and a lower enlarged head 105 thereof is located in a groove 106 formed in the yoke. After the yoke has been brought into its adjusted position, in properly locating the sleeve 81 and the chuck controlled thereby, the bolt 103 is screwed to a position where its head 105 is clamped or locked against the yoke 95.

A chuck arbor 111 (Fig. 2) is disposed centrally of the chuck sleeve 81 and extends throughout its entire length. The upper end of the chuck arbor 111 is threaded at 112 to provide engagement for a nut 113 which rests upon the upper end of the chuck sleeve 81. This supports the chuck arbor within the chuck sleeve, holding it in an exact adjusted vertical position. The lower end of the chuck arbor 111 is threaded at 114, this end of the arbor extending beyond the lower end of the chuck sleeve 81.

A chuck 121, provided with an upwardly extending stem 122, is threadedly secured upon the threaded seat 114 of the chuck arbor, the chuck stem 122 being shouldered to cooperate with the threads to hold the parts from turning. The upper end of the chuck stem 122 engages the lower end of the chuck sleeve 81 in a tongue and groove connection 123 (see also Fig. 8) which insures unified rotation of chuck and chuck sleeve while allowing some vertical movement therebetween. Adjustment of the chuck sleeve 81 as previously described thus effects a corresponding adjustment of the chuck.

The chuck arbor 111 is clamped in its adjusted position by a clamping nut 125 (Figs. 1 and 2) which is threadedly engaged at 126 on the upper end of the chuck sleeve 81. This nut 125 is drawn down against the upper end of the chuck arbor 111 and clamps the same in fixed position, the nuts 113, 125 thus cooperating with each other. The holding of the chuck 121 in stationary position is the result of combined forces applied through the chuck arbor 111, chuck sleeve 81, the adjusting unit comprising the yoke 95, together with the clamping nuts 63, 113 and 125 and the bolt 103. The cam 77 is also held in stationary position by these cooperating parts.

For holding the can, there is provided a can lift plunger 131 (Figs. 1 and 2) which is mounted on the upper end of a stem 132 having sliding movement within a bearing 133 formed on the outer end of an arm 134 projecting forwardly of the frame 51. This plunger 131 is in axial alignment with the chuck 121 and is raised and lowered in proper time relative to the other operations of the mechanism, this being a usual construction in seaming machines.

Such a plunger 131 is adapted to support a can 135 on which a cover 136 has preferably been loosely applied. As the can and cover are raised with the rising plunger, the cover is seated against the chuck 121 in the usual manner and can and cover are so clamped between the plunger and the chuck in which clamped position it is held stationary throughout the seaming operation.

The rotating parts of the seaming head are carried on the bearing unit 66 (Fig. 2). For this purpose a gear 141 is disposed exteriorly of the cam sleeve 61 and adjacent its shoulder 64, this gear being provided with a cupped hub 142 extending upwardly from the body of the gear and enclosing a roller bearing track 143 which constitutes a movable element of the bearing unit 66. The gear 141 is thus rotatably mounted upon and supported by the stationary cam sleeve 61, the movable parts of the seaming head being carried directly or indirectly from this gear 141.

A split disc 145 is seated within the lower part of the gear 141 and is held in position by screws 146 seated within the gear 141. This disc 145 extends inwardly to provide an annular supporting ledge 147 which engages within an annular groove 148 formed in a seaming cam sleeve 149 mounted exteriorly of the sleeve 61, disc 145 being also keyed at 150 to prevent turning thereon. A ball bearing unit 151 is preferably disposed between the upper end of the sleeve 149 and the shoulder 64 to provide easier turning action.

The bottom end of the cam sleeve 149 is projected outwardly in an annular shoulder 155 which provides a support for a double cam 156 disposed thereon. A key 157 inserted between sleeve and cam locks the two and prevents turning therebetween. This cam sleeve is rotated, with the gear 141, around the stationary sleeve 61, a bushing 158 being interposed between the members 61, 149. Gear 141 is adapted to be driven in any suitable manner as by a gear 161 meshing therewith and gear 161 may be a part of the mechanism of the seaming machine in which the seaming head is mounted.

A casing or head frame 181 is provided for rotation around the stationary sleeve parts 111, 81, 61 and around the sleeve 149 and its double cam 156. This frame at its upper end carries a gear 182 keyed thereto, this gear being located directly beneath the gear 141. Gear 182 meshes with a gear 183 located directly beneath the gear 161, the gears 161, 183 preferably moving simultaneously.

By reason of there being a different number of teeth in the two gears 141, 182 and in the two gears 161, 183 a rate of travel is imparted to the sleeve 149 and cam 156 which is different from that imparted to the seaming head frame 181. This difference is slight, however, and constitutes a differential gearing drive, a common feature in machines of this character. An auxiliary bushing 184 is interposed between the sleeve 149 and the frame 181 and a flange 185 of this bushing carries a washer 186 secured thereto by screws 187, this providing the proper sliding surfaces between the moving parts.

Figure 5:
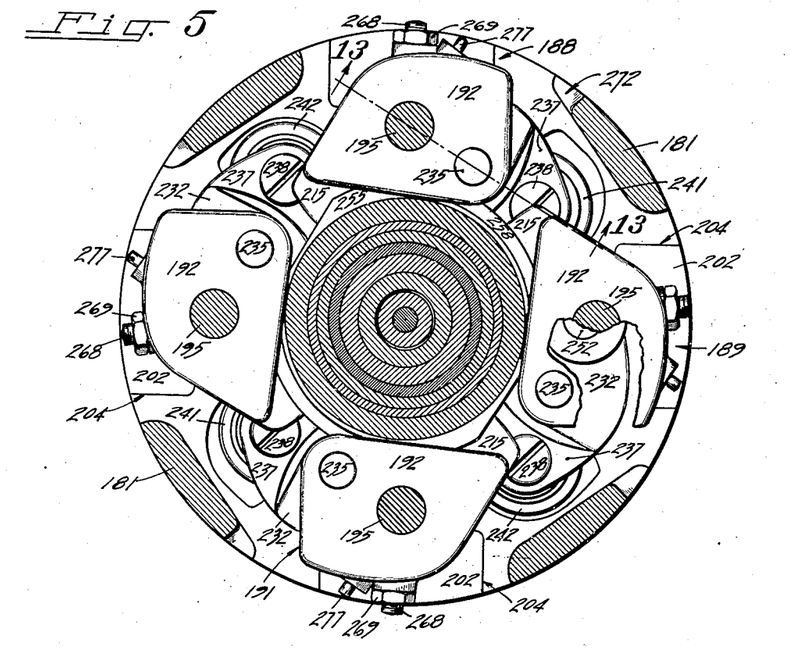
Fig. 5 is a plan sectional view taken substantially along the line 5—5 in Fig. 2.
Figure 8:
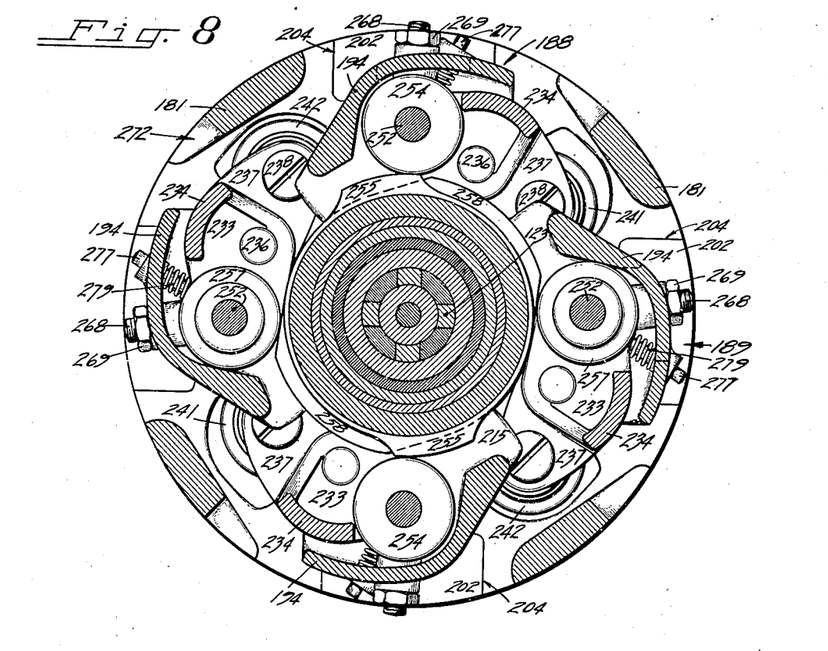
Fig. 8 is a plan sectional view taken substantially along the broken line 8—8 in Fig. 2.
Figure 10:
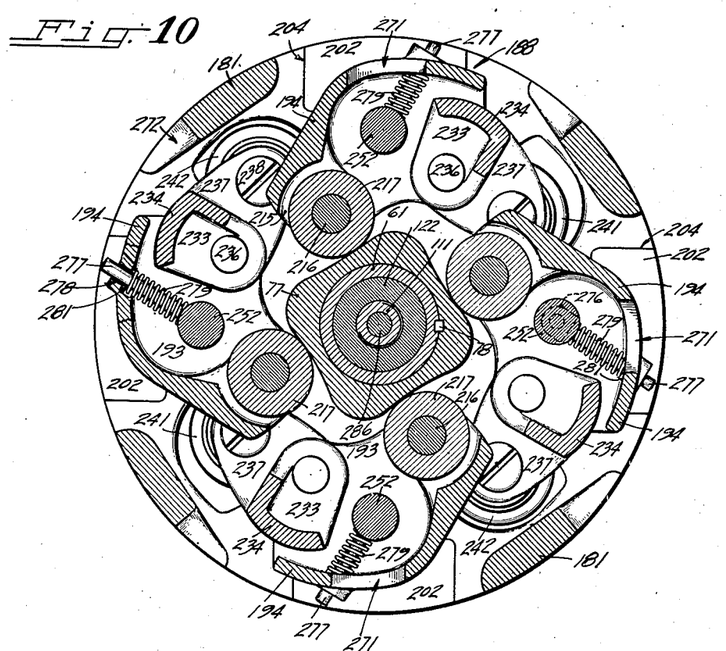
Fig. 10 is a plan sectional view taken substantially along the line 10—10 in Fig. 2.

The head frame 181 is adapted to carry the seaming lever units, there being provided as a preferred embodiment, two first operation units 188 and two second operation units 189 (Figs. 5, 8 and 10). These units are carried bodily in the seaming head frame 181 and are thus carried around the stationary chuck 121 and the can and cover 135, 136 held thereby.

Each seaming unit 188 or 189 comprises a seaming lever cage 191 (Fig. 4) formed with a top 192 and a bottom plate 193 which are connected by a web 194. The plate 192 is formed integrally with an upwardly projecting stud 195 (see also Figs. 2 and 13) and the bottom plate 193 is similarly provided with a downwardly projecting stud 196.

Figure 12:
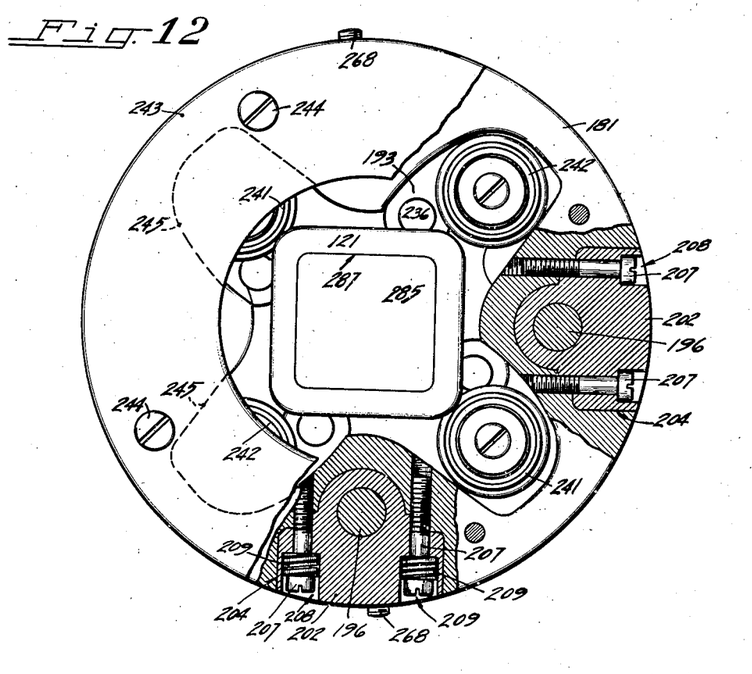
Fig. 12 is a bottom or under plan view of the seaming head, partly broken away, as viewed from a horizontal plane, indicated by the line 12—12 in Fig. 2.

Each unit 191 is pivotally connected with the head frame 181 and is assembled within the frame in a simple construction which permits individual assembly and removal of a seaming unit. For this purpose there is provided an upper clamping block 201 and a lower clamping block 202 respectively inserted within radial recesses or slots 203, 204 cut into the head frame 181 (Figs. 1 and 12). The block 201 is provided with a vertical bore 205 which forms a bearing for the stud 195 of its associated seaming unit and block 202 is similarly recessed at 206 to provide a bearing for the stud 196 of the unit.

Blocks 201, 202 are removably held in fixed position by bolts 207 threadedly engaging the head frame 181. The head of each bolt 207 is seated within a counterbore 208 formed in the block 201 or block 202 as the case may be. The blocks associated with the second operation seaming unit are yieldingly held within their slots 203, 204, a spring 209 being confined between block and bolt head for this purpose. This yielding mounting allows for the added thickness of metal at the side seam and permits the second operation seaming rollers to properly iron out the finished seam.

The seaming cage units 191 partially enclose the seaming levers which support the seaming rollers. To insure that the seaming rollers follow the contour of the chuck and the can and cover being seamed, each cage unit is caused to oscillate on its pivotal mountings 195, 196. Each cage body is formed with a pair of spaced extension lugs 215 (Figs. 4, 10 and 14) which provides a mounting for a vertically disposed pin 216 spanning the space between the lugs and providing rotatable support for a cam roller 217. Each cam roller 217 engages the periphery of the pattern cam 77 and this cam imparts a proper oscillation to the seaming cage to cause it to follow the shape of the chuck 121.

Figure 3:
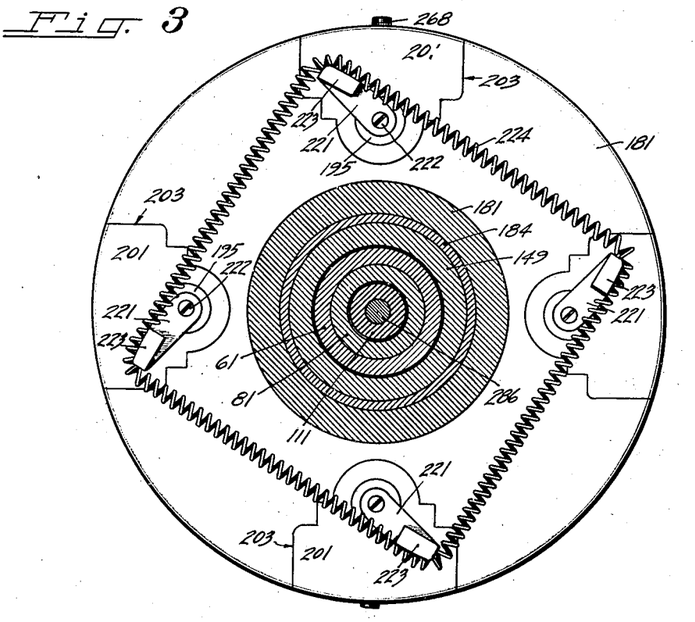
Fig. 3 is a plan sectional view, taken substantially along the line 3—3 in Fig. 1.
Figure 4:
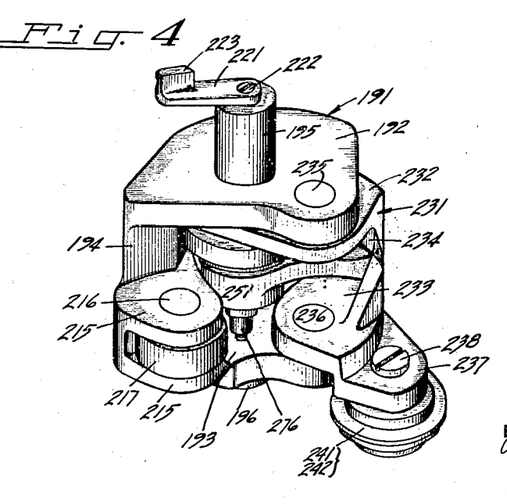
Fig. 4 is a perspective view of one of the seaming units.

The cam rollers 217 are yieldingly held in contact with the periphery of the cam by a device best illustrated in Figs. 1, 3 and 4 which comprises an arm 221 fixed to the upper end of each stud 195 being held thereon by a screw 222. The arms 221 project above the upper face of the head frame 181 and an end of each arm is extended upwardly into a lug 223. The lugs 223 of the four arms 221 are engaged by a coil spring 224 which is stretched around the outside of these members, as best shown in Fig. 3. This yielding connection holds the cage units 191 in the proper position at all times so as to insure the proper cam and roller contact.

A seaming lever 231 (Figs. 4, 10 and 14) is pivotally mounted within the cage 191 of each seaming unit. This lever is provided with spaced top and bottom walls 232, 233 which are joined together by a web 234. A pivot pin 235 extends through the cage top plate 192 and through the lever top wall 232 and provides the pivotal connection for the upper part of the seaming lever. In a similar manner, a pin 236 provides the pivotal connection for the lower part of the seaming lever, this pin extending through the bottom cage plate 193 and through the bottom wall 233 of the seaming lever.

The lower wall 233 of the seaming lever is extended in a lug or projection 237 which provides a support for a seaming roller. Each seaming roller is mounted upon a stud 238 carried by the lug 237, the seaming levers for the first operation of seaming having first operation rollers 241 and the other levers carrying second operation rollers 242. A lower ring plate 243 (Fig. 12) is provided for enclosing the bottom part of the seaming head, this plate being held on the frame 181 by screws 244. The plate 243 (see also Figs. 2 and 13) is grooved or cut away at 245 adjacent each seaming roller to provide clearance therefor.

Figures 13, 14:
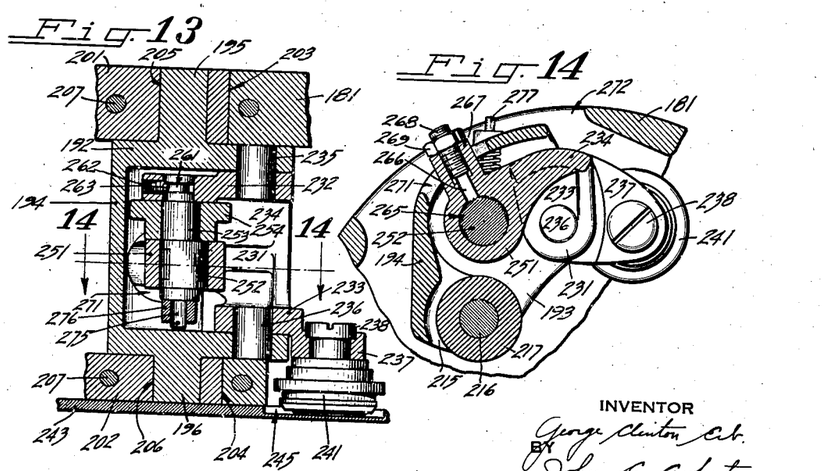
Fig. 13 is a fragmentary transverse sectional view taken substantially along the line 13—13 in Fig. 5.
Fig. 14 is a fragmentary plan sectional view taken substantially along the line 14—14 in Fig. 13.

The seaming roller 241 or 242 is caused to move in and out for its proper seaming operation on the flange of the can cover 136 by engagement with the proper cam track of the double cam 156. The web 234 of each seaming lever is enlarged at 251 to provide a bearing for a vertically disposed pin 252 (Figs. 2, 13 and 14). This pin 252 is provided with an eccentric section 253 on which a cam roller is mounted. For each first operation seaming unit a cam roller 254 (Fig. 13) is provided having an enlarged upper section which engages with an upper cam track 255 (Fig. 8) formed in the double cam 156.

In a similar manner the second operation seaming units carry cam rollers 257 (Fig. 2) which are enlarged at their lower sections to provide the proper engaging surface for a second cam track 258 formed in the double cam 156 directly beneath the cam track 255. As the seaming head revolves and the seaming lever units move around the axis of the seaming head, the cam rollers 254, 257 respectively traverse their cam tracks 255, 258 and impart proper movement to their associated seaming levers and seaming rollers 241, 242 all in proper synchronism to effect the proper seaming operations.

The eccentric mounting of each section 253 of each pin 252 provides an adjustment for its seaming roller 254, or 257 carried thereby. Each pin 252 is extended upwardly beyond its section 253, in a grooved top end 261 (Figs. 2 and 13), which extends into a vertical opening in the top wall 232 of its associated seaming lever. A set-screw 262 is threadedly located in this wall adjacent the head 261 and a reduced end 263 thereof projects within the groove and prevents the pin 252 falling from its bearing seat.

Each pin 252 is held in adjusted position within its seat by a holding device best illustrated in Fig. 14. Each pin 252 is grooved vertically at 265 and a portion of this grooved part is engaged by a rectangular toothed keeper 266 which slides within a channel formed in an extension 267 projecting outwardly from the web part 234. The teeth of the keeper 266 are forced into the vertical grooves 265 of the pin 252 by a clamp screw 268 threadedly engaged within the extension 267, this screw being held in position by a lock nut 269. With the nut 269 and the screw 268 loosened, the pin 252 may be freely rotated until its eccentric section 253 properly positions the roller 254 or 257 carried thereby. With the keeper 266 forced into locking position by the screw 268 and nut 269, the cam roller is positively held.

The wall of the web 194 is cut away at 271 to provide clearance for the extended parts of the seaming lever and for a similar purpose the head frame 181 is cut away at 272 (Figs. 1 and 2). Each pin 252 (Figs. 10 and 13) at its lower end extends into a reduced section 275 which is engaged by an eye 276 formed on the inner end of a pin 277 which projects laterally through an opening 278 cut through the cage web 194. A coil spring 279 surrounds each pin 277 and is interposed between the eye 276 thereof and a washer 281 seated in the wall 194 adjacent the opening 278. This construction holds the seaming lever in correct position to insure engagement between the cam rollers 254, 257 and the cam tracks of the double cam 156.

A knockout pad 285 (Fig. 2) is mounted on the bottom end of a vertically disposed knockout rod 286 which has the usual sliding movement for can discharge. For this purpose the rod is mounted in and has movement through the chuck arbor 111, the chuck stem 122 and the clamping nut 125. This pad 285 normally rests within a pocket 287 formed in the chuck 121 but is projected from the chuck face in the usual manner when discharging the seamed can from the chuck.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a seaming head for uniting can ends to cans, the combination of a can support for holding cans during the seaming operation, a head frame having rotative movement relative to said support and the can carried thereby, seaming cages carried by said frame and having top and bottom walls which are provided with pivots for said cages, seaming levers pivotally mounted in the cages and partially confined within said cages on their pivotal mountings to cause said seaming rollers on said levers to be in position to traverse the can seam when the cages are attached to said head frame.

2. In a seaming head for uniting can ends to cans, the combination of a stationary chuck for holding a can and end to be seamed, a head frame having rotative movement around said chuck, seaming cages carried by said frame insertible and removable as units and having top and bottom walls which are provided with pivots to be pivotally mounted on the head, seaming levers within said cages and carrying seaming rollers, means for shifting said cages on their pivotal mountings during the rotation of said head to cause said seaming rollers on said levers to traverse the can seam, and means for pivoting said levers on said cages to move said seaming rollers into and out of operative position.

3. In a seaming head for uniting can ends to cans, the combination of a stationary chuck for holding a can and end to be seamed, a stationary cam associated with said chuck, a head frame having rotative movement around said chuck, seaming cages carried by said frame and having spaced walls pivotally mounted thereon and connected by webs along one side thereof, leaving one side open, and carrying cam rollers for engagement with said cam, seaming levers pivotally mounted within said cages and extending out through the open sides of said cages for carrying seaming rollers, yielding means for holding said cam rollers against said stationary cam during the rotation of said seaming head to move said seaming cages on their pivots and cause said seaming rollers to traverse the can seam, and means for pivoting said levers on said cages to move said seaming rollers into and out of operative position.

4. In a seaming head for uniting can ends to cans, the combination of a stationary chuck for holding a can and end to be seamed, a stationary cam associated with said chuck, a head frame having rotative movement around said chuck, seaming cages hollow on their interiors carried by said frame and pivotally mounted thereon and carrying cam rollers for engagement with said stationary cam, seaming levers pivotally mounted within the hollow interiors of said cages and carrying seaming rollers and cam rollers, a movable cam mounted adjacent said stationary cam and having movement relative to said head frame, yielding means located exteriorly of said cages for holding said cage cam rollers against said stationary cam to cause the said seaming rollers to traverse the can seam, and yielding means located interiorly of said cages for holding said seaming lever cam rollers against said movable cam to further move said seaming rollers into and out of seaming position.

5. In a seaming head for uniting can ends to cans, the combination of a stationary chuck for holding a can and end to be seamed, a chuck sleeve connected with said chuck, a head frame having rotative movement around said chuck and said sleeve, hollow seaming cages carried by said frame and pivotally mounted thereon, seaming levers pivotally mounted within said cages and carrying seaming rollers, a stationary cam sleeve associated with said chuck, a cam carried by said cam sleeve, means acting through said cam and chuck sleeves for individually adjusting said cam and said chuck, means including said stationary cam for shifting said cages on their pivotal mountings during the rotation of said head to cause said seaming rollers on said levers to traverse the can seam, and means for pivoting said levers on said cages to move said seaming rollers into and out of operative position.

6. In a seaming head for uniting can ends to cans, the combination of a stationary chuck for holding a can and end to be seamed, a head frame having rotative movement around said chuck, seaming cages carried by said frame and having top and bottom walls which are pivotally mounted thereon, seaming levers pivotally mounted in the same axis in said top and bottom walls and partially confined within said cages and carrying cam rollers and seaming rollers, eccentric means for adjusting said cam rollers relative to said levers, and cam means operating through said cam rollers for pivoting said levers on said cages to move said seaming rollers into and out of seaming position.

7. In a seaming head for uniting can ends to cans, the combination of a stationary chuck for holding a can and end to be seamed, a head frame having rotative movement around said chuck and having radial slots formed therein, seaming cages carried by said frame and pivotally mounted in blocks inserted from the outside of said frame in said radial slots, and removable means for holding said blocks in inserted position in said frame.

8. In a seaming head for uniting can ends to cans, the combination of a stationary chuck for holding a can and end to be seamed, a head frame having rotative movement around said chuck and having radial slots formed therein, a pair of first operation seaming cages and a pair of second operation seaming cages carried by said frame and pivotally mounted in blocks inserted from the outside of said frame in said radial slots, means for fixedly holding the blocks of said first operation seaming caps in inserted position, and yielding means applied to the blocks of said second operation seaming cages for yieldingly holding them on said frame.

9. The combination with the seaming head having means for operating seaming levers to form a can seam, and having a recess therein, of a seaming unit adapted to be inserted and held in said recess of the seaming head, said unit comprising a cage formed with an interior space, a seaming lever pivotally supported thereby within and extending from said space, and a seaming roll and cam roll connected with said seaming lever, said seaming roll and cam roll being in operative position when said cage is in said recess.

GEORGE CLINTON ERB.